Nov. 20, 1928.
G. S. KECK
1,692,173
DIRIGIBLE HEADLIGHT
Original Filed Feb. 5, 1926
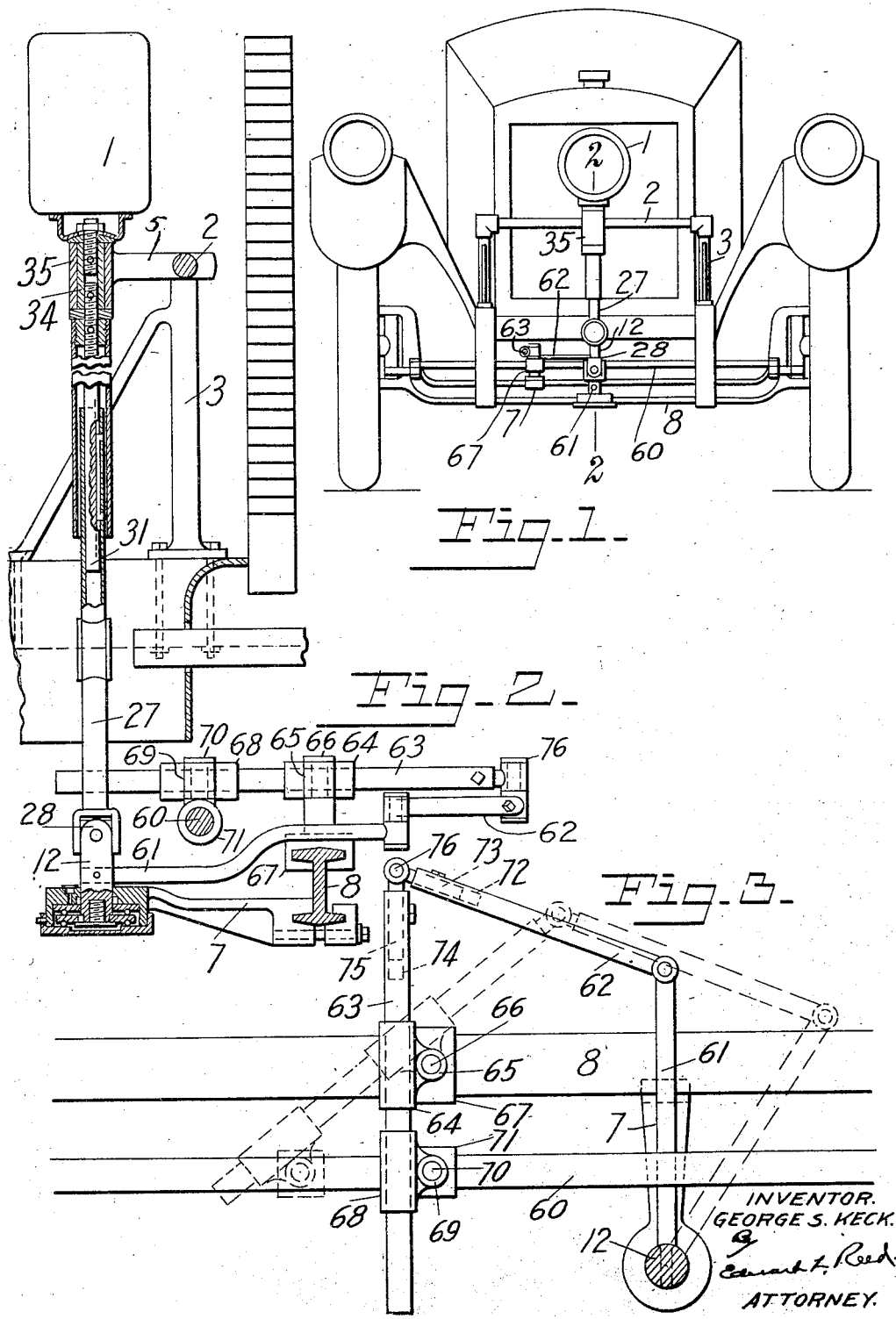
INVENTOR.
GEORGE S. KECK.
ATTORNEY.

Patented Nov. 20, 1928.

1,692,173

UNITED STATES PATENT OFFICE.

GEORGE S. KECK, OF PASADENA, CALIFORNIA, ASSIGNOR TO THE INTERNATIONAL CONTROLLED LAMP COMPANY, OF WILMINGTON, DELAWARE, A CORPORATION OF DELAWARE.

DIRIGIBLE HEADLIGHT.

Original application filed February 5, 1926, Serial No 86,117. Divided and this application filed April 23, 1927. Serial No. 186,014.

This invention relates to operating mechanism for dirigible headlights for automobiles and the like and is a division of application for patent filed by me February 5, 1926, Serial No. 86,117.

One object of the invention is to provide means for so connecting the headlight with a transversely movable part of the steering mechanism of the automobile that the headlight will be turned in the same direction that said part moves, this being especially desirable where the drag bar of the steering mechanism is arranged in front of the axle.

A further object of the invention is to provide such a mechanism which will be simple in its construction, positive in its operation and of such a character that it may be easily installed.

Other objects of the invention will appear as the mechanism is described in detail.

In the accompanying drawings Fig. 1 is a front elevation of an automobile showing the invention applied thereto; Fig. 2 is a vertical sectional view of part of the automobile showing the operating mechanism in elevation; and Fig. 3 is a plan view of the operating mechanism.

In these drawings I have illustrated one embodiment of my invention and have shown the same as applied to a single headlight mounted at the front of an automobile which has the drag bar of its steering mechanism arranged in front of the axle. It will be understood, however, that this particular embodiment has been chosen for the purpose of illustration and that the device may take various forms and may be utilized in headlight installations of various kinds.

In that particular embodiment here illustrated a single headlight 1 is arranged substantially centrally of the automobile radiator and is carried by a bracket 5 extending forwardly from a transverse bar 2 which is supported on the frame of an automobile by means of standards 3 which are rigidly secured to the respective side members of the automobile frame. A bracket 7 is rigidly secured to the front axle 8 and extends forwardly therefrom, and rotatably mounted on the forward portion of this bracket, for movement about a vertical axis, is an actuating device or stud 12 which is operatively connected with the headlight 1 by means of an extensible connecting device here shown in the form of telescoping rods 27 and 31. The lower tubular member 27 is connected by a universal joint 28 with the actuating stud 12 and the upper member or rod 31 has at its upper end a part 34 which is rotatably mounted in a bearing 35 carried by the bracket 5 and to the upper end of which the lamp 1 is rigidly secured. The two parts 27 and 31 of the connecting device have free vertical movement to accommodate the same to the relative movements of the axle and frame of the automobile but they are held against relative rotation so that any rotatory movement imparted to the actuating stud 12 will be transmitted to the headlight 1.

Operative movement is imparted to the actuating stud 12 through suitable mechanism connecting the same with the drag bar forming part of the steering mechanism of the automobile. In some automobiles this drag bar is arranged in front of the axle 8, as shown at 60, and moves in the direction in which the wheels are turned, and where the actuating stud 12 is connected with such a drag bar the connection must be of such a character that the headlight will be turned in the direction in which the wheels turn and in which the drag bar moves. Rigidly secured to the actuating device 12 is an arm or lever 61 which extends rearwardly therefrom above the axle 8 and is pivotally connected in the rear of the axle with one end of a link 62, the other end of which is pivotally connected with a lever 63. The lever 63 is mounted on the axle 8 for movement about a vertical axis and preferably is mounted in a sleeve 64, in which it is rigidly secured, and this sleeve has a vertical bearing 65 to receive a stud 66 carried by a bracket 67 rigidly secured to the axle, the arrangement being such that the lever 63 will move about the axis of the vertical stud 66. The lever 63 extends forwardly from the axle 8 above the drag bar 60 and has slidably mounted thereon a sleeve 68 which is pivotally connected with the drag bar and which, in the present instance, has a vertical bearing 69 to receive a vertical stud 70 carried by a bracket 71 rigidly secured to the drag bar, so that as the drag bar is moved in the direction of its length the lever 63 will move about the axis of the stud 66 and the sleeve 68 will accommodate itself to the changed position of the lever. Thus it will be seen that the movement transmitted from the drag bar through the lever 63, link 62 and arm 61 to the headlight actuating device, or stud, 12 is such as to turn the headlight in the direction in which the drag bar moves. As shown in dotted lines in Fig. 3, the movement of the drag bar to the left will move the lever 63 about its axis and cause the lever 61 to be moved to the right, thus turning the actuating device 12 and consequently the lamp in the same direction that the drag bar moves and turning the lamp a distance corresponding to the movement of the steering mechanism.

To regulate the amount of movement of the drag bar the connection between the link 62 and the lever 63 is made adjustable. As here shown, the link 62 is provided at that end adjacent to the lever 63 with an axial bore 72 in which is rigidly but adjustably mounted a rod 73. The lever 63 is also provided with an axial bore 74 in which is rigidly but adjustably mounted a rod 75, the outer end of the rod 75 being pivotally connected with the outer end of the rod 73, as shown at 76. By adjusting the rods 73 and 75 with relation to the link and to the lever 63, respectively, the length of the lever 63 may be so varied and the movement of the actuating lever arm 61 may be regulated.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a dirigible headlight mechanism, a headlight, means for supporting said headlight on the frame of an automobile for movement about a vertical axis, a bracket having means for supporting the same on the axle of said automobile, an actuating device mounted on said bracket for movement about a vertical axis, an operative connection between said actuating device and said headlight, a lever pivotally supported on said axle independently of said actuating device, means for connecting one end of said lever with a part of the steering mechanism of said automobile, and means for connecting the other end of said lever with the actuating device for said headlight.

2. In a dirigible headlight mechanism, a headlight, means for supporting said headlight on the frame of an automobile for movement about a vertical axis, a bracket having means for supporting the same on the axle of said automobile, an actuating device mounted on said bracket for movement about a vertical axis, an operative connection between said actuating device and said headlight, an arm rigidly secured to said actuating device, a lever having means for pivotally mounting the same on said axle at a point spaced from said bracket, a link connecting said lever with said arm, and means for connecting said lever with a part of the steering mechanism for said automobile.

3. In a dirigible headlight mechanism, a headlight, means for supporting said headlight on the frame of an automobile for movement about a vertical axis, a bracket having means for supporting the same on the axle of said automobile, an actuating device mounted on said bracket for movement about a vertical axis, an operative connection between said actuating device and said headlight, an arm rigidly secured to said actuating device and extending across said axle, a lever pivotally mounted on said axle, a link connecting said lever with said arm, and means for slidably connecting said lever on that side of said axle opposite said link with the transversely movable drag bar of the steering mechanism of said automobile.

4. In a dirigible headlight mechanism, a headlight, means for supporting said headlight on the frame of an automobile for movement about a vertical axis, a bracket having means for supporting the same in front of the axle of said automobile, a stud mounted on said bracket for movement about a vertical axis, means for operatively connecting said stud with said headlight, an arm rigidly secured to said stud and extending to the rear of said axle, a lever having means for pivotally mounting the same on said axle for movement about a vertical axis, a link connecting the rear end of said lever with the rear end of said arm, a sleeve slidably mounted on said lever in front of said axle, and means for pivotally connecting said sleeve with the drag bar forming part of the steering mechanism of said automobile.

5. In a dirigible headlight mechanism, a headlight, means for supporting said headlight on the frame of an automobile for movement about a vertical axis, a bracket having means for securing the same to the axle of said automobile, an actuating device mounted on said bracket for movement about a vertical axis, means for operatively connecting said actuating device with said headlight, an arm rigidly secured to said actuating device, a lever pivotally mounted on said axle, means for connecting said lever on one side of said axle with a part of the steering mechanism of said automobile, a link pivotally connected to said arm, and connecting members pivotally connected one to the other and rigidly and adjustably connected with the adjacent ends of said link and said lever on the other side of said axle.

In testimony whereof, I affix my signature hereto.

GEORGE S. KECK.